United States Patent [19]
Zeuner

[11] 3,799,497
[45] Mar. 26, 1974

[54] TWO STAGE SOLENOID OPERATED VALVE

[75] Inventor: Kenneth W. Zeuner, Newtown, Pa.

[73] Assignee: Control concepts, Inc., Newtown, Pa.

[22] Filed: Apr. 20, 1972

[21] Appl. No.: 245,929

[52] U.S. Cl. .................................. 251/30, 251/44
[51] Int. Cl. .................... F16k 31/383, F16k 31/40
[58] Field of Search ............................ 251/30, 44

[56] References Cited
FOREIGN PATENTS OR APPLICATIONS
| | | | |
|---|---|---|---|
| 789,241 | 1/1958 | Great Britain | 251/30 |
| 969,108 | 4/1958 | Germany | 251/30 |
| 1,084,998 | 7/1960 | Germany | 251/44 |

*Primary Examiner*—Arnold Rosenthal
*Attorney, Agent, or Firm*—Maleson, Kimmelman & Ratner

[57] ABSTRACT

A two stage solenoid operated valve assembly having a first stage poppet movable for seating in a first stage orifice to control fluid flow in a second stage. A second stage poppet is movable for seating in a second stage orifice to control the main flow of fluid. Flow from the first stage orifice to the outlet is through a flow passage which is received within a longitudinal opening extending over the length of the second stage poppet. The second stage poppet moves longitudinally with respect to the flow passage.

5 Claims, 3 Drawing Figures

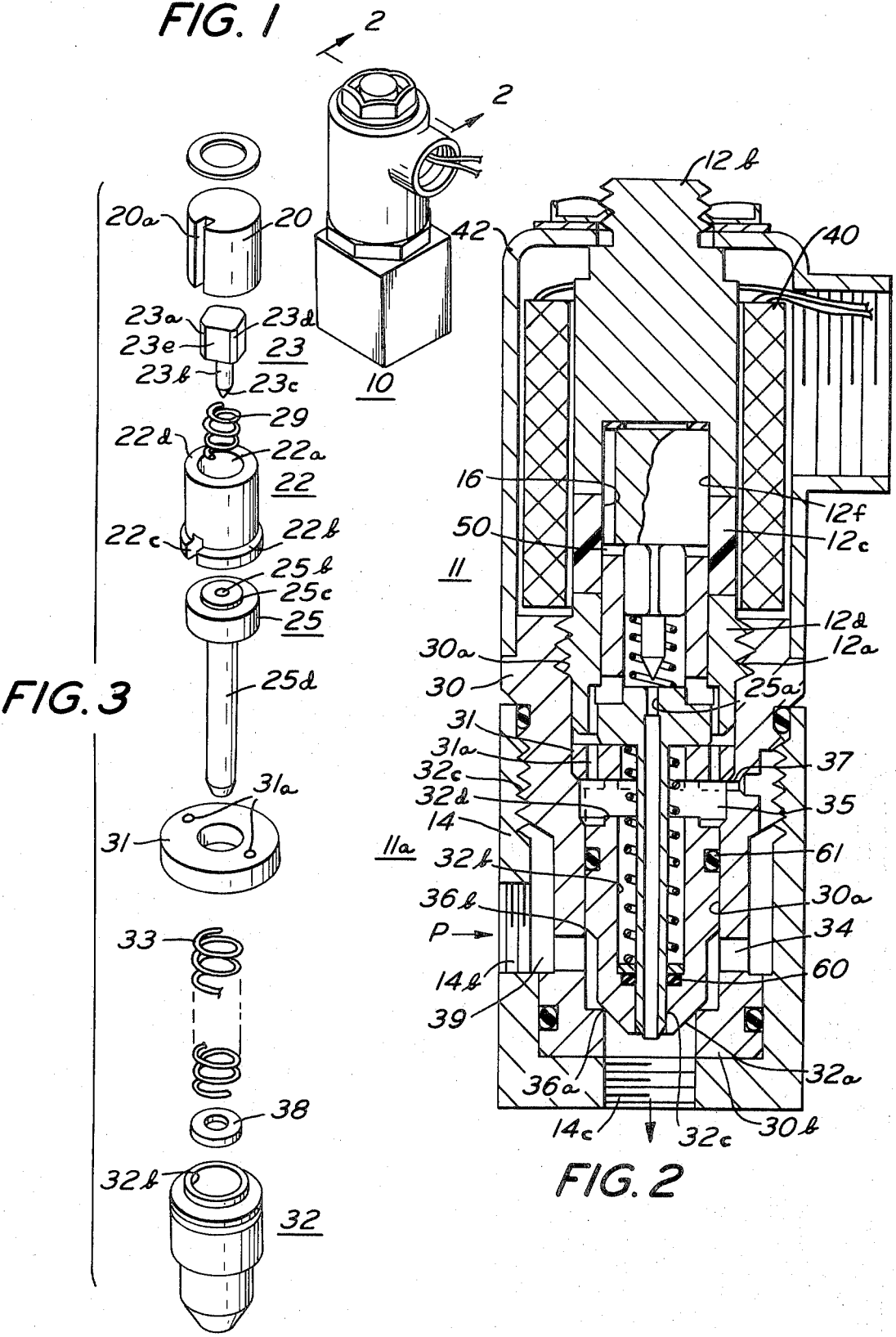

3,799,497

1

TWO STAGE SOLENOID OPERATED VALVE

BACKGROUND OF THE INVENTION

1. Field of the Invention

This invention relates to the field of two stage solenoid operated poppet valves.

2. Prior Art

Prior two stage solenoid operated valves have had the disadvantage of requiring special ports for flow between the first stage orifice and downstream. These special porting requirements have been met by drilling flow channels in the valve housing. However, such channels in the housing has caused difficulty when multiple valve units are to be mounted. In addition, when valves have been made separate from the housing, such valves could not be checked out as a total unit.

SUMMARY OF THE INVENTION

A two stage solenoid operated valve assembly having a first stage poppet movable between an open and a closed state seating in a first stage orifice for controlling flow of fluid through a second stage. A second stage poppet is movable between an open state and a state seating in a second stage orifice for controlling the flow of fluid between the inlet and the outlet of the valve assembly. The first stage poppet is electromagnetically moved between the open and closed state for actuating, by way of second stage fluid flow, the second stage poppet.

The second stage poppet has a longitudinal opening extending over its entire length. Received within that opening is a flow passage in fluid communication with the first stage orifice which provides fluid flow from the first stage orifice to the outlet. In this manner, the flow passage is provided internally of the valve assembly and special porting requirements in the valve housing are avoided.

DESCRIPTION OF THE DRAWINGS

FIG. 1 is a perspective view of a two stage solenoid operated valve assembly of the present invention;

FIG. 2 is an elevational sectional view of the valve of FIG. 1 taken along lines 2—2; and FIG. 3 is an exploded view of many of the valve elements of FIG. 2.

Referring to FIGS. 1-3, there is shown a two stage solenoid operated poppet valve 10. Valve 10 comprises a first stage 11 and a second stage 11a with fluid pressure entering a body or block 14 by way of inlet 14b and exiting by outlet 14c.

First stage 11 is of the normally open poppet type and is described in detail in my copending U.S. Pat. application Ser. No. 218,875 for CONTROLLED AIR GAP IN A SOLENOID VALVE filed Jan. 19, 1972. With first stage 11 normally open, the entire two stage valve 10 operates normally open. However, as later described in detail, first stage 11 may be normally closed so that valve 10 operates normally closed. First stage 11 comprises a tubular sleeve assembly or housing 12 having threads 12a formed on the outer surface of a lower sleeve section 12d. Threads 12a engage upper internal threads 30a of a plug-in second stage valve body 30. First stage sleeve assembly 12 comprises the lower sleeve section 12d, the middle sleeve section 12c and an upper sleeve section 12b. Sections 12b and 12d are made of very high magnetically permeable material which is defined as ferromagnetic. On the other hand, section 12c is made of very low magnetically permeable material such as, for example, stainless steel. As shown, sections 12b –d are rigidly secured together, as for example, by welding.

Sections 12b–d together provides an internal cylindrical chamber 16 for housing a solid cylindrical armature 20 and a tubular pole piece 22 having a tubular central chamber 22a. Armature 20 is slideably received within chamber 16 with an upper section thereof being within section 12b and only a lower portion thereof being within section 12c. Pole piece 22 nests in sealed relation within chamber 16 with a lower flange 22b engaging a lip formed in chamber 16. Most of the pole piece is disposed within section 12d with only the upper portion thereof being within section 12c.

Secured between the bottom surface of piece 22 and a spacer 31 is a control orifice assembly 25 having a downwardly extending tube 25d within which is a central chamber 25a in fluid communication with outlet 14c, as shown. Chamber 25a forms in its upper end, an orifice 25b which mates with a first stage poppet 23. In order to provide proper alignment, orifice assembly 25 has a shoulder 25c which is received within the lower end of chamber 22a and is coaxial therewith.

Poppet 23, preferably made of hard metal of low magnetically permeable material, is slideably received within chamber 22a and comprises an upper guide portion 23a and a lower portion 23b. The upper surface of portion 23a is contacted by the lower face of armature 20 and portion 23b terminates in a valve plug 23c. Portion 23a forms a guide having side walls 23d which contact and slide within chamber 22a and align plug 23c into and out of orifice 25b. In addition, walls 23e provide flow passages for the fluid.

A spring 29 is disposed between and engages the upper surface of assembly 25 and the lower surface of guide 23a. The spring assures that the first stage is maintained normally open. Spring 30 provides sufficient compression or bias to overcome full line upstream pressure at inlet 14b to life poppet 23 from orifice 25b when the valve is switched from its energized to deenergized state. The upstream pressure is applied to armature 20 and poppet 23 would tend to keep the poppet closed after the valve is deenergized.

A pair of aligned slots 22c are formed through flange 22b to permit fluid flow. For pressure balance of the upper and lower surfaces of armature 20, a longitudinal channel 20a is formed in the outer wall of the armature. Accordingly, fluid flow through channel 22a may be traced through passages 23e and channel 20a to the upper surface of armature 20 to provide pressure balance.

In the second stage, plug-in valve body 30 is formed having an internal cylindrical chamber 30a with a second stage poppet 32 slideably received therein. The lower end of valve body 30 forms a section of reduced inner diameter to define an orifice 30b for mating with a valve plug 32a of poppet 32. Spacer 31 is rigidly secured within a reduced diameter seat in chamber 30a and provides flow passages 31a and a central opening for receiving tube 25d and second stage spring 33. Tube or flow passage 25d is centrally received within an inner tubular opening or chamber 32b of poppet 32. Poppet tubular opening 32b has a section 32c of a reduced inner diameter which together with O-ring 60 provides a fluid seal around tube 25d. Washer 38 is disposed about tube 25d and above O-ring 60 to provide a seat for the lower end of a spring 33, the upper end of which engages assembly 25. In addition, an O-ring 61 is received within the outer surface of poppet 32 above plug 32a to provide a fluid seal between the outer surface and chamber 30a. In this manner, poppet 32 moves vertically with respect to fixed tube 35d with fluid seals between tube 25d and poppet 32 and between poppet 32 and chamber 30a. Valve body 30 is threadedly received within body or block 14.

In the normally open state with electromagnet deenergized, upstream pressure is applied to inlet 14b; poppets 23 and 32 are in their uppermost positions. Thus, orifice 30b is fully open and upstream pressure flows directly from inlet 14b through channels 34 to outlet 14c. Spring 29 is effective to maintain poppet 23 in its uppermost position which causes poppet 32 to be in its uppermost position, as shown in dotted line, for the reasons to be described.

In the normally open state, fluid flow from upstream pressure may be traced by way of inlet 14b, chamber 39 (around body 30), second stage pilot 37, chamber 35 (formed within chamber 30a), flow passages 31a, channels 22c and then through orifice 25b and out the outlet 14c.

The pressure in chamber 35 is effective to produce a force tending to move poppet 32 downwardly and close orifice 30b. This force is equal to the pressure in chamber 35 times the horizontal cross-sectional area of chamber 30a minus tube 25d. On the other hand, the force tending to move poppet 32 upwardly, opening orifice 30b, is dependent on whether poppet 32 is closed or opened. If poppet 32 is in its extreme uppermost position, the differential pressure between inlet 14b and outlet 14c is applied upwardly to the same horizontal cross-sectional area as that defined above. However, if poppet 32 is in its extreme lowermost position closing orifice 30b, the full line upstream pressure is applied upwardly only to the horizontal cross-sectional area of a section of plug 32a that is actually exposed to the upstream pressure. That exposed plug section is between rings 36a –b formed on plug 32a.

In the normally open state with orifice 25b open, it will be understood that pilot 37 acts as a pressure divider between upstream pressure at inlet 14b and downstream pressure at orifice 25b. Pilot 37 is preferably of smaller diameter than that of orifice 25b. These elements are sized so that as a result of the pressure dividing action, pressure in chamber 35 does not build up sufficiently to provide a downstream force which would keep poppet 32 closed against the upward force. Thus, with orifice 25b open, the force tending to move poppet 32 upwardly is greater than the force tending to move it downwardly. Thus, poppet 32 moves to its extreme uppermost position with shoulder 32d engaging space 31.

Upon energization of electromagnet 40, as later described in detail, poppet 23 is moved downwardly to close first stage orifice 25b. Accordingly, the pressure in chamber 35 increases and provides a sufficient downward force on poppet 32 to close orifice 30b. It will be understood that with orifice 25b closed, there is substantially the same pressure in chamber 35 as that applied to plug section 36a–b exposed to upstream pressure. However, in view of the differences in the horizontal cross-sectional areas, the downward force is greater than the upward force sufficient to close and maintain poppet 32 closed and seated against orifice 30b.

Upon deenergization of electromagnet 40, spring 29 is effective to push poppet 23 upwardly opening orifice 25b. The pressure in chamber 35 decreases and poppet 32 is forced downwardly opening orifice 30b for the reasons previously described.

Second stage spring 33 is a light spring and is used to overcome friction when there is no pressure applied to valve 10. At that time, the spring is effective to maintain poppet 32 closed against seat 30b.

Now that the detailed operation of second stage 11a has been described, the detailed operation of first stage 11 will be set forth. A hollow elongated cylindrical electromagnet 40 provides a source of magnetic flux and receives in a central opening sleeve assembly 12. Cover 42 encloses and protects electromagnet 40 and has a central opening for receiving therein an upper threaded portion of sleeve section 12b. Cover 42 is secured in place by nut 43 which threadedly engages section 12b. Cover 42 as well as armature 20, pole piece 22 and bodies 14 and 32 are further of highly magnetically permeable material (ferromagnetic).

A circuit of magnetic flux lines produced by electromagnet 40 when energized may be traced as follows. The flux lines flow down through sleeve section 12b and then across through armature 20 and air gap 50 to pole piece 22. The flow continues through sleeve section 12d, body 30 and cover 42 with the circuit being completed to section 12b. Sleeve section 12c is made of very low magnetically permeable material and extends in the area generally adjacent air gap 50 so that section 12c provides a gap to the circuit greater than that of gap 50. Accordingly, the circuit of flux lines is directed and concentrated through air gap 50.

In operation of first stage 11, electromagnet 40 has been energized so that armature 20 has been attracted to pole piece 22. The armature forces down on poppet 23 so that poppet valve plug 23c is seated within orifice 25b. Poppet 23 is dimensioned to have a total height (longitudinal length from valve seat to upper surface) so that when it is seated, air gap 50 is compressed to provide a "controlled" air gap. This controlled air gap is necessary to allow for wear on valve plug 23c and orifice 25b. With the plug seated, if the upper surface of poppet 25 were level with pole piece upper surface 22d, then as wear would take place, the valve would leak.

In the valve closed state, a substantially high value force is necessary to keep poppet plug 23c seated against the upstream force of fluid. This seating force is achieved by the concentration of flux lines which now flow across the narrower size controlled air gap and produces a substantially high value attractive force between armature 20 and pole piece 22. Thus, controlled air gap 50a is dimensioned so that from a typical f–d curve sufficient attractive force will be produced to seat and maintain seated the poppet against the inlet force of fluid.

In summary, it will now be understood that tube or flow passage 25d is rigidly secured to orifice assembly 25 and thus is fixed with respect to orifice 25b. Thus, fluid flows from orifice 25b only through tube 25d and then into outlet 14c. Tube 25d is received within chamber 32b and this flow passage is at least of length to extend over the entire longitudinal length of the chamber which extends from the upper surface of shoulder 35d to the lower surface of plug 32a. In this manner, the second stage poppet or plug means 32 is movable longitudinally with respect to tube 25d between the valve open and closed state.

Thus, it will now be understood that separate flow channels in the valve housing 14 are not required since the flow from orifice 25b to outlet 14c is achieved within valve 10 by way of flow passage 25d. In this manner, a multiple of valves 10 may easily be mounted in multiple valve units and valve 10 may be checked out by itself as a total unit.

There has now been described how two stage valve 10 operates in a normally open manner. However, two stage valve 10 may also operate as a normally closed valve by using a normally closed first stage. A normally closed first stage which may replace the normally open elements are shown and described in my copending U.S. Pat. application Ser. No. 243,633 for NORMALLY CLOSED SOLENOID OPERATED VALVE, filed Apr. 13, 1972, now U.S. Pat. No. 3,737,141. Elements 12, 20, 22, 23 and 29 would be replaced by corresponding normally closed elements. The control orifice assembly 25, electromagnet 40, cover 42, and all of the elements in second stage 11a herein would remain the same.

What is claimed is:

1. A two stage solenoid operated valve assembly comprising
   an orifice for a first of said two stages,
   first stage plug means movable between a first stage valve state stage and a state seating in and closing said first stage orifice for controlling flow of fluid through a second of said two stages.
   a second stage orifice opening directly into an outlet of said valve assembly,
   second stage plug means movable between a second stage valve open state and a state seating in and closing said second stage orifice for controlling flow of fluid from an inlet to an outlet of said valve assembly,
   solenoid means for electromagnetically moving said first stage plug means between said open and closed state for actuating by way of said control of fluid flow said second stage plug means respectively between said open and closed state,
   said second stage plug means having a longitudinal opening extending throughout the length thereof, and
   a tube in fluid communication with said first stage orifice being received within said longitudinal opening of said second stage plug means for providing fluid flow from said first stage orifice directly into said outlet during said first stage valve open state, said tube having one end rigidly secured with respect to said first stage orifice and having the other end and adjacent tubular surface floating and non-fixed and engaging only said second stage plug means, said other end being completely open and located slightly below said second stage orifice within the reduced pressure of the vena contracta.

2. The valve assembly of claim 1 in which said longitudinal opening is a central chamber formed within said second stage plug means having a section of reduced inner diameter adjacent one end thereof and means for fluid sealing between said reduced inner diameter section and said tube.

3. The valve assembly of claim 2 in which there is provided second stage pilot means for providing fluid flow between said inlet and a chamber formed adjacent a first end of said second stage plug means for providing a force of direction tending to move said second stage plug means to said valve closed position, and
   fluid passageways for providing fluid flow between said chamber and said first stage orifice.

4. The valve assembly of claim 3 in which said second stage pilot means includes an orifice of diameter smaller than that of said first stage orifice to provide in said first stage valve open state a pressure divider so that the pressure in said chamber provides a force less than the force applied to a second end of said second stage plug means thereby opening said second stage valve.

5. The valve assembly of claim 1 in which there is provided first stage pole piece means forming a chamber for slideably receiving at least a minor portion of said first stage plug means.

* * * * *

UNITED STATES PATENT OFFICE
CERTIFICATE OF CORRECTION

Patent No. 3,799,497      Dated March 26, 1974

Inventor(s) Kenneth W. Zeuner

It is certified that error appears in the above-identified patent and that said Letters Patent are hereby corrected as shown below:

In claim 1, line 5, delete "state stage" and insert --open state--.

Signed and sealed this 6th day of August 1974.

(SEAL)
Attest:

McCOY M. GIBSON, JR.
Attesting Officer

C. MARSHALL DANN
Commissioner of Patents